United States Patent
Yamada et al.

[11] Patent Number: 5,734,216
[45] Date of Patent: Mar. 31, 1998

[54] MAGNET ROTOR FOR SYNCHRONOUS MOTOR

[75] Inventors: Hiyoshi Yamada, Iwakura; Shigenori Kinoshita, Kawasaki; Takao Yanase, Kawasaki; Kenji Endo, Kawasaki; Hiroyuki Hirano, Kanagawa, all of Japan

[73] Assignee: Nissan Motor Co. Ltd., Yokohama, Japan

[21] Appl. No.: 564,623

[22] Filed: Nov. 29, 1995

[30] Foreign Application Priority Data

Nov. 29, 1994 [JP] Japan .................. 6-319160

[51] Int. Cl.$^6$ .................. H02K 21/00; H02K 15/03
[52] U.S. Cl. .................. 310/156; 310/42
[58] Field of Search .................. 310/156, 42, 43; 29/598; 427/208.2, 127; 428/332

[56] References Cited

U.S. PATENT DOCUMENTS

| | | | |
|---|---|---|---|
| 3,598,647 | 8/1971 | Von Alten et al. | 310/156 |
| 3,731,242 | 5/1973 | Hofman | 335/284 |
| 4,011,120 | 3/1977 | Aggen | 156/74 |
| 4,586,244 | 5/1986 | Muller | 29/598 |
| 4,617,726 | 10/1986 | Denk | 310/156 |
| 4,739,427 | 4/1988 | Kilmer et al. | 360/97 |
| 4,792,712 | 12/1988 | Stokes | 310/156 |
| 4,829,657 | 5/1989 | Wright | 310/318 |
| 4,920,326 | 4/1990 | Agarwala | 335/284 |
| 4,935,080 | 6/1990 | Hassell et al. | 310/154 |
| 5,193,266 | 3/1993 | Caputo | 310/156 |
| 5,201,111 | 4/1993 | Prohaska | 310/42 |
| 5,402,025 | 3/1995 | Saito et al. | 310/156 |

FOREIGN PATENT DOCUMENTS

| | | | |
|---|---|---|---|
| 56-117567 | 9/1981 | Japan | 310/156 |
| 57-206260 | 12/1982 | Japan | 310/156 |
| 4-48573 | 2/1992 | Japan | |

*Primary Examiner*—Thomas M. Dougherty
*Assistant Examiner*—B. Mullins
*Attorney, Agent, or Firm*—Foley & Lardner

[57] ABSTRACT

A magnet rotor for a synchronous motor includes a yoke formed of a magnetic material. A generally cylindrical permanent magnet is disposed around the yoke magnet and has N and S poles alternately located in the circumferential direction of the permanent magnet. An adhesive is filled in the clearance between the outer peripheral surface of the yoke and the inner peripheral surface of the permanent magnet. The adhesive is hardened at a hardening temperature, which is around a maximum temperature encountered during operation of the motor to accomplish bonding between the yoke and the permanent magnet. The clearance between the yoke and the permanent magnet has a dimension L given by the following formula:

$$L \geq (E \times \Delta L) / \sigma s$$

where $E$ is a tensile elastic modulus of the adhesive; $\Delta L$ is a change amount of the clearance upon thermal expansion or contraction; and $\sigma s$ is a tensile stress applied to the adhesive.

13 Claims, 7 Drawing Sheets

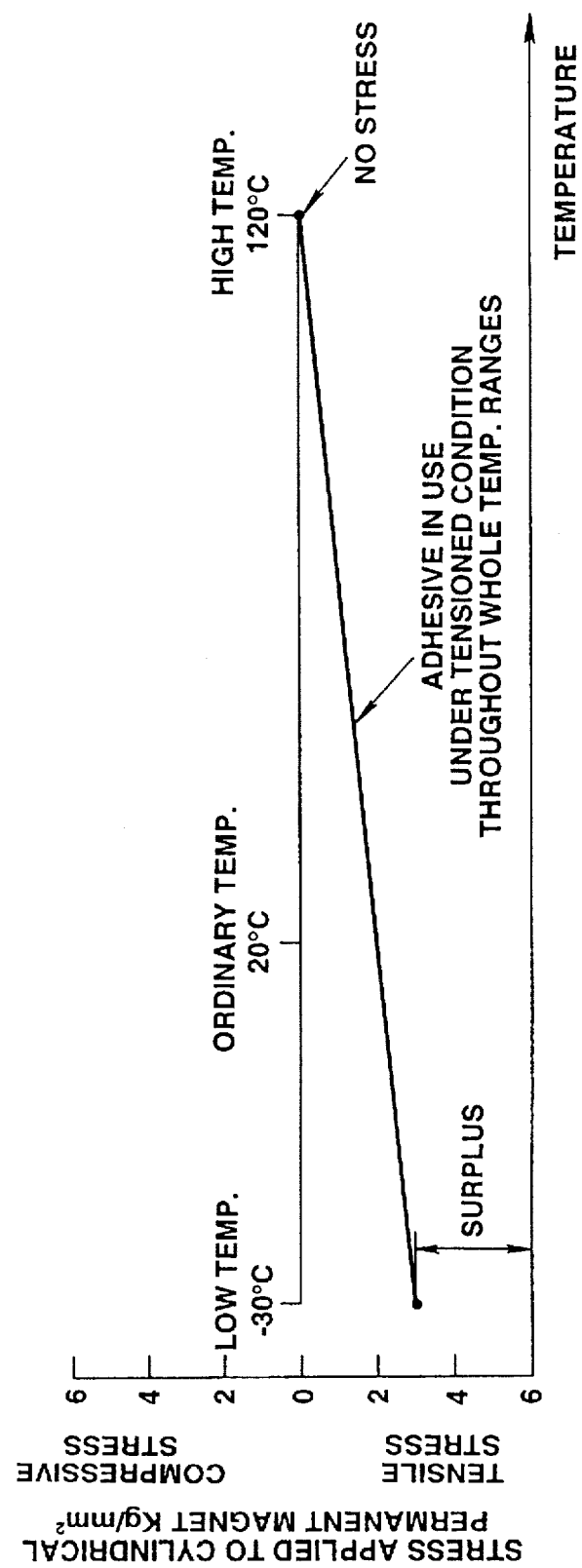

MAGNET ROTOR FOR SYNCHRONOUS MOTOR

BACKGROUND OF THE INVENTION

1. Field of the Invention

This invention relates to improvements in a magnet rotor for a permanent magnet type synchronous motor.

2. Description of the Prior Art

Hitherto a magnet rotor of a permanent magnet type synchronous motor is usually produced as follows: First, an adhesive is applied on the outer peripheral surface of a cylindrical yoke formed of a magnetic material. Then, the yoke with the adhesive is inserted inside a cylindrical permanent magnet. Thereafter, the adhesive is hardened at an ordinary temperature. A production method analogous to the above is disclosed, for example, in Japanese Patent Provisional Publication No. 4-48573.

A fragmentary sectional view of a bonding section of the magnet rotor produced in the above manner is shown in FIGS. 7A to 7C in which FIG. 7A shows the bonding section in a condition in which adhesion has been completed at an ordinary temperature; FIG. 7B shows the bonding section at a high temperature condition; and FIG. 7C shows the bonding section at a low temperature condition.

However, drawbacks have been encountered in the magnet rotor produced in the above-discussed manner. That is, the adhesive is hardened at an ordinary temperature, and therefore a thermal expansion of the magnet rotor occurs as shown in FIG. 7B when an environmental temperature is raised from an ordinary temperature (around 20° C.) corresponding to the adhesive hardening temperature (t0) to a level of, for example, 120° C. corresponding to the highest temperature (t1) in use of the magnet rotor.

At this time, a difference in expansion between the yoke and the permanent magnet is produced in an amount of about 0.125 mm at a temperature difference (t1−t0=120− 20=10° C.) as indicated at a point A in FIG. 8 since the yoke and the permanent magnet are different in coefficient of thermal expansion. The yoke has, for example, a coefficient of thermal expansion of $11.4 \times 10^{-6}$ in case of being formed of a material S10C, while the permanent magnet has, for example, a coefficient of thermal expansion of $1.5 \times 10^{-6}$ in case of being formed of a neodymium iron boron (Nd—Fe—B) magnet. Additionally, the adhesive is in use under a compressed condition since the adhesive is hardened at the ordinary temperature. Therefore, it is necessary to absorb the above thermal expansion difference of 0.125 mm under deformation of the cylindrical permanent magnet.

However, assuming that an allowable stress of the cylindrical permanent magnet is 5.5 Kgf/mm², the cylindrical permanent magnet is unavoidably broken at a stage of being deformed in an amount of about 0.1 mm, exceeding the allowable stress, as shown in FIG. 9. Such a deformation amount of about 0.1 mm corresponds to the expansion difference of 0.1 mm indicated at a point B. Accordingly, the temperature difference (t1−t0) is 75° C., so that the highest temperature in use of the rotor becomes 95° C. This relationship is diagramatically shown in FIG. 10, in which the cylindrical permanent magnet reaches its thermal-durability limit at 95° C. and is unavoidably broken.

SUMMARY OF THE INVENTION

It is an object of the present invention is to provide an improved magnet rotor for a synchronous motor, by which drawbacks encountered in conventional magnet rotors can be effectively overcome.

Another object of the present invention is to provide an improved magnet rotor for a synchronous motor, which can be effectively prevented from being thermally damaged or broken even in use at high temperatures.

A further object of the present invention is to provide an improved magnet rotor for a synchronous motor, in which an adhesive disposed between a yoke and a permanent magnet is in a tensioned condition during use of the motor.

An aspect of the present invention resides in a magnet rotor for a synchronous motor, which magnet rotor comprises a yoke formed of a magnetic material and having a cylindrical outer peripheral surface. A generally cylindrical permanent magnet is disposed around the yoke and has N and S poles, the permanent magnet having a cylindrical inner peripheral surface. An adhesive is disposed in a clearance between the outer peripheral surface of the yoke and the inner peripheral surface of the permanent magnet. The adhesive is hardened at a temperature around the maximum temperature in use of the motor so as to accomplish bonding between the yoke and the permanent magnet.

Another aspect of the present invention resides in a method of producing a magnet rotor for a synchronous motor. The method comprises the following steps: (a) preparing a yoke formed of a magnetic material and having a cylindrical outer peripheral surface; (b) preparing a generally cylindrical permanent magnet having N and S poles and having a cylindrical inner peripheral surface; (c) locating the permanent magnet around the yoke; (d) filling an adhesive in a clearance between the outer peripheral surface of the yoke and the inner peripheral surface of the permanent magnet; and (e) heating the adhesive at a temperature around the maximum temperature in use of the motor so as to accomplish bonding between the yoke and the permanent magnet.

According to the above magnet rotor of the present invention, adhesion or bonding between the yoke and the permanent magnet is accomplished by hardening the adhesive at the temperature around the highest temperature encountered in use of the motor, and therefore the permanent magnet can be effectively prevented from being thermally broken thereby largely extending a temperature range in which the rotor can be used. This renders it possible to make the motor small-sized. Additionally, a binding operation of the outer peripheral portion becomes unnecessary thereby reducing a production cost.

In the present invention, it is preferable that the clearance between the yoke and the permanent magnet has a dimension L which is given by the following formula:

$$L \geq (E \times \Delta L) / \sigma s$$

where E is a tensile elastic modulus of the adhesive; ΔL is a change amount of the clearance upon thermal expansion or contraction; and σs is a tensile stress applied to the adhesive;

wherein the clearance change amount ΔL is given by the following equation:

$$\Delta L = (t1 - t0) \times D \times (\alpha 1 - \alpha 2)$$

where t1 is the hardening temperature at which the adhesive is hardened; t0 is a lowest environmental temperature in use of the motor; D is a diameter of a section of the yoke on which the adhesive is applied; α1 is a coefficient of thermal expansion of the yoke; and α2 is a coefficient of thermal expansion of the permanent magnet.

With this clearance between the yoke and the permanent magnet, a sufficient surplus can be obtained relative to thermal breakage of the permanent magnet due to a tensile stress of the adhesive at low temperatures, so that a reliability in operation of the motor can be obtained even under application of a high centrifugal force to the permanent magnet.

BRIEF DESCRIPTION OF THE DRAWINGS

FIG. 3 is a graph showing the stress applied to the cylindrical permanent magnet of the magnet rotor of FIG. 1 in terms of changing temperatures;

DETAILED DESCRIPTION OF THE DRAWINGS

Figure 1:
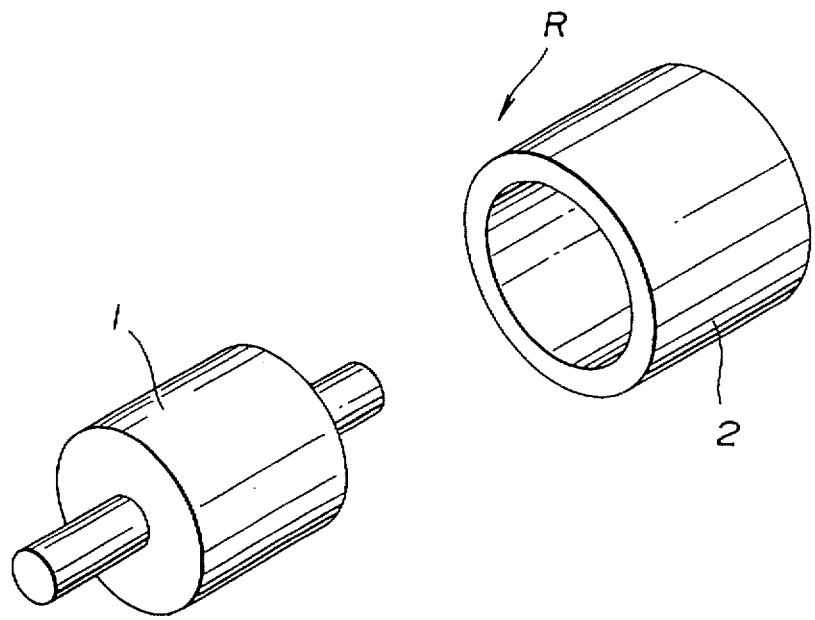
FIG. 1 is an exploded perspective view of an embodiment of a magnet rotor according to the present invention.

Referring now to FIG. 1, an embodiment of a magnet rotor of a synchronous motor, according to the present invention is illustrated by the reference numeral R. The magnet rotor R comprises a cylindrical yoke 1 formed of a magnetic material such as S10C (according to Japanese Industrial Standard No. G4051). A cylindrical permanent magnet 2 is made of neodymium iron boron (Nd—Fe—B) magnet and coaxially disposed around or on the yoke 1, though they are shown separate from each other in FIG. 1. The permanent magnet 2 is provided with N and S poles each of which extends in a radial direction and in a thickness direction of the cylindrical permanent magnet 2. The N and S poles are alternately located at equal intervals in a peripheral direction of the cylindrical permanent magnet 2. The N and S poles are formed, for example, by magnetizing the permanent magnet 2.

In this embodiment, a silicone-system adhesive (containing silicone as a main component) having a high elongation percentage is filled in a clearance between the outer peripheral surface of the yoke 1 and the inner peripheral surface of the permanent magnet 2. The silicone system adhesive has, for example, a tensile elastic modulus of not higher than 3 kgf/mm$^2$, and an elongation percentage of not lower than 200%. The silicone system adhesive is hardened upon heating at a (adhesion) temperature which is around the highest temperature (ranging from 80° C. to 160° C.) encountered in use or during operation of the motor, thereby bonding the yoke 1 and the permanent magnet 2. The elongation percentage is a percentage of the maximum elongation of the adhesive relative to an original length of the adhesive. In this instance, the thickness of the layer of the adhesive is 0.2 mm. In production of the magnet rotor R, the adhesive is filled in the clearance between the outer peripheral surface of the yoke 1 and the inner peripheral surface of the permanent magnet 2 after the yoke 1 and the permanent magnet 2 are positioned coaxial with each other. However, the adhesive may be first applied on the peripheral surface of the yoke 1, and then the yoke 1 with the adhesive may be inserted into the inner bore of the permanent magnet 2.

Figures 2A, 2B, 2C:
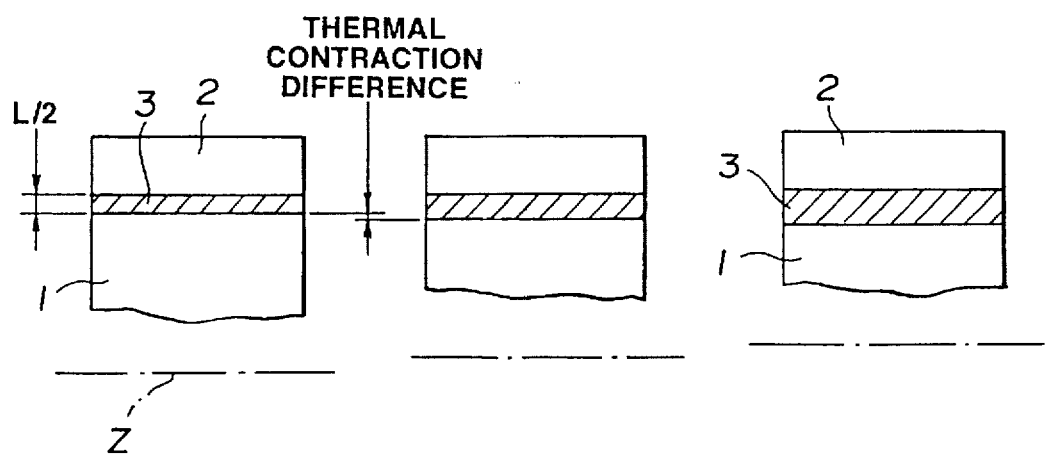
FIGS. 2A to 2C are schematic fragmentary sectional views showing the bonding states of a bonding section between a yoke and a cylindrical permanent magnet of the magnet rotor of FIG. 1 in various temperature conditions.

FIGS. 2A to 2C show adhesion or bonding states of a bonding section between the yoke 1 and the permanent magnet 2 at various temperatures, respectively. In these figures, a dash-dot line indicates a rotational axis of the rotor R. FIGS. 2A, 2B and 2C correspond to the adhesion states at a high temperature, at an ordinary temperature, and at a low temperature, respectively. Adhesion between the yoke 1 and the permanent magnet 2 is accomplished by hardening the adhesive 3 at a high temperature around the highest temperature in use of the motor (accordingly, the rotor R), in which the difference between the outer diameter of the yoke 1 and the inner diameter of the permanent magnet 2 is L. Here, the coefficient of thermal expansion α1 of the yoke 1 is higher than that α2 of the permanent magnet 2. As a result, a difference in thermal contraction is made between the yoke 1 and the permanent magnet 2 at the ordinary temperature as shown in FIG. 2B. A further large difference in thermal contraction is made at the low temperature as shown in FIG. 2C.

Accordingly, the adhesive 3 is in use under a tensioned condition throughout whole temperature ranges in which the motor is operated or in use, as shown in FIG. 3.

The difference L between the outer diameter of the yoke 1 and the inner diameter of the permanent magnet 2 is set to meet the following equation:

$$L = (E \times \Delta L) / \sigma s$$

where E is a tensile elastic modulus of the adhesive; ΔL is a change amount of the clearance (between the outer diameter of the yoke 1 and the inner diameter of the permanent magnet 2) upon thermal expansion or contraction; σs (=Pa) is a tensile stress of the adhesive (=a pressure acting on the inner peripheral surface of the permanent magnet 2).

The clearance change amount ΔL upon thermal expansion or contraction is given by the following equation:

$$\Delta L = (t1-t0) \times D \times (\alpha1-\alpha2)$$

where t1 is a hardening temperature at which the adhesive is hardened to accomplish adhesion or bonding between the yoke and the permanent magnet 2; t0 is the lowest environmental temperature in use of the motor; D is a diameter of a section (of the yoke 1) on which the adhesive is applied; α1 is a coefficient of thermal expansion of the yoke 1; and α2 is a coefficient of thermal expansion of the permanent magnet 2.

Additionally, the tensile stress σs is given by the following equation:

$$\sigma s = \{\sigma\theta \times (k^2-1)\} / \{(k^2/R^2)+1\}$$

where k is a value of the outer diameter of the permanent magnet / the inner diameter of the permanent magnet; R is a value of the outer diameter of the permanent magnet / an average diameter [=(the outer diameter+the inner diameter) / 2)] of the permanent magnet; and σθ is an allowable stress of the permanent magnet.

Next, a concrete example of the above embodiment magnet rotor according to the present invention will be discussed.

Figure 8:
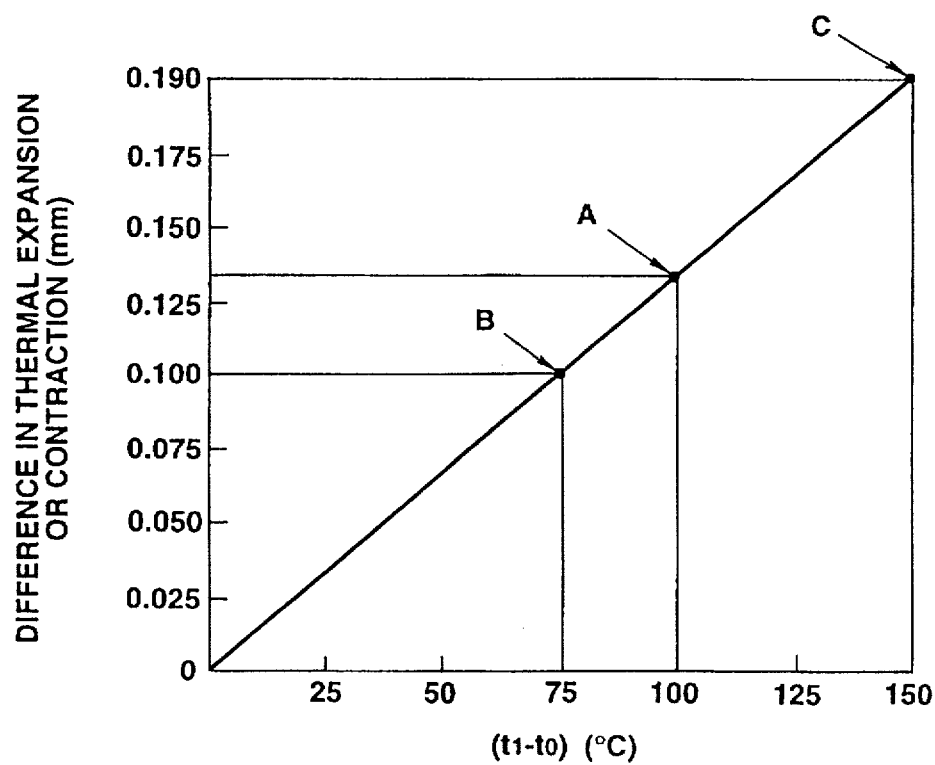
FIG. 8 is a graph showing the difference in thermal expansion or contraction between the yoke and the cylindrical permanent magnet in terms of the difference in temperature between a temperature (t1) in use of a motor and a temperature (t0) at which the adhesive is hardened, which is common in the embodiment of the present invention and the conventional magnet rotor.
Figure 9:
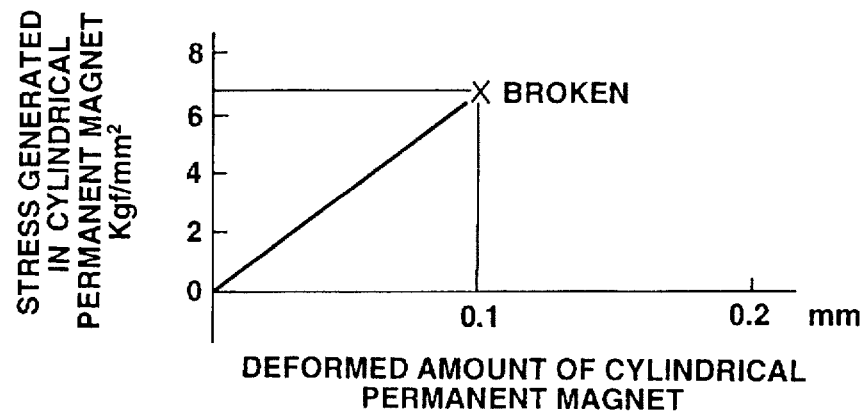
FIG. 9 is a graph showing the stress generated in the cylindrical permanent magnet of the conventional magnet rotor, in terms of the deformed amount of the cylindrical permanent magnet.
Figure 10:
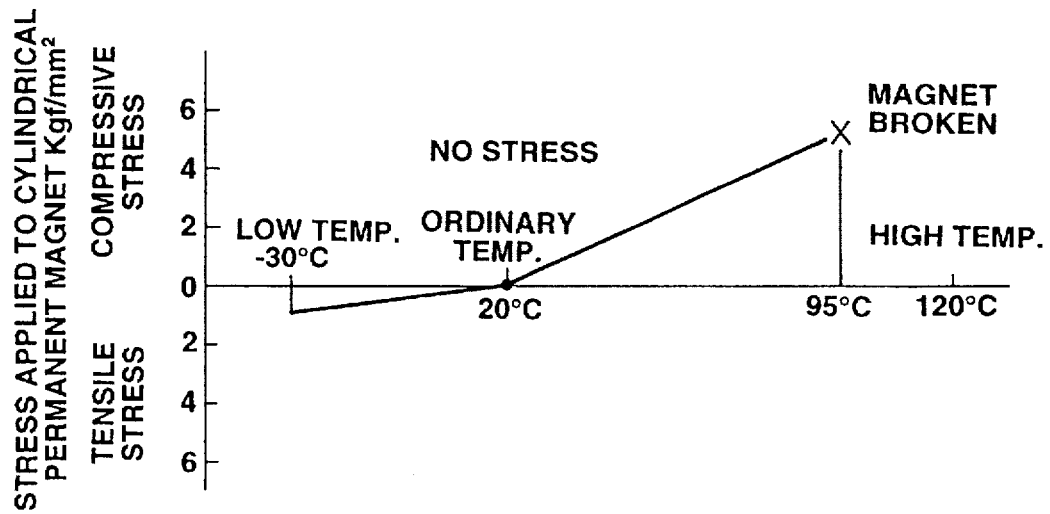
FIG. 10 is a graph showing the stress applied to the cylindrical permanent magnet of the conventional magnet rotor, in terms of the changing temperature.

Assuming that the rotor of the embodiment is in use within a temperature range of from −30° C. to 120° C., a temperature difference (t1−t0) is 150° C. Additionally, assuming that the adhesive-applied section diameter D is 130 mm, the thermal expansion coefficient α1 of the yoke 1 is 11.4×10⁻⁶ while the thermal expansion coefficient α2 of the permanent magnet 2 is 1.5×10⁻⁶, the clearance change amount ΔL upon thermal expansion or contraction corresponds to a point C indicated in FIG. 8 and takes the following value:

$$\Delta L = 150 \times 130 \times (1.5 - 11.4) \times 10^{-6}$$
$$= -0.193 \text{ mm}$$

Figure 4A:
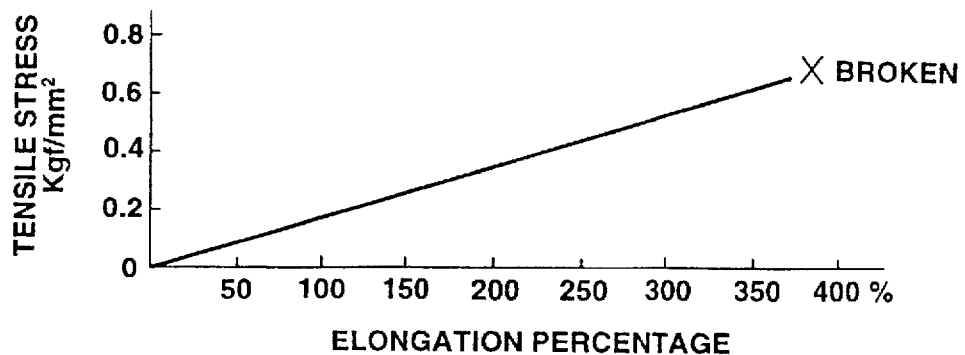
FIG. 4A is a graph showing the relationship between the tensile strength and the elongation percentage of an adhesive used in the magnet rotor of FIG. 1.
Figure 4B:
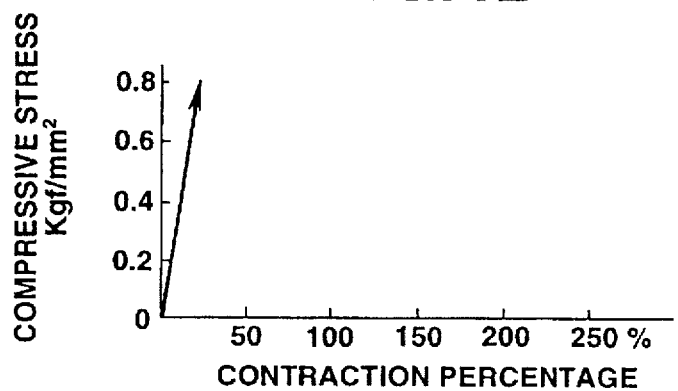
FIG. 4B is a graph showing the relationship between the compressive stress and the contraction percentage of the adhesive of FIG. 4A.
Figure 4C:
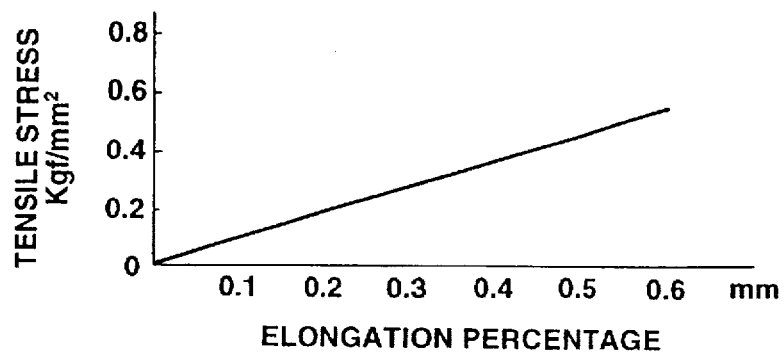
FIG. 4C is a graph showing the relationship between the tensile stress and the elongation percentage in case of the thickness of the layer of the adhesive of FIG. 4A being 0.2 mm.

FIGS. 4A, 4B and 4C depict a characteristics of the adhesive 3, in which FIG. 4A shows the relationship between the tensile stress and the elongation percentage; FIG. 4B shows the relationship between the compressive stress and the contraction percentage; and FIG. 4C shows the relationship between the tensile stress and the elongation percentage in case that the thickness of the layer of the adhesive 3 is 0.2 mm. These lead to the fact that the tensile elastic modulus E of the adhesive 3 is 0.2 Kgf/mm².

Figure 5:
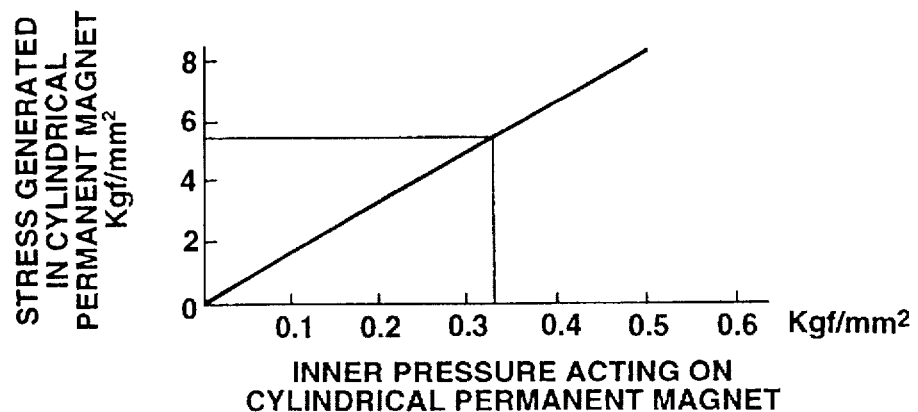
FIG. 5 is a graph showing the stress generated in the cylindrical permanent magnet of the magnet rotor of FIG. 1, in terms of the inner pressure acting on the cylindrical permanent magnet.

In case that the tensile stress σs of the adhesive 3 (i.e., the inner pressure Pa acting on the inner peripheral surface of the permanent magnet 2) is not higher than about 0.33 Kgf/mm², the stress generated in the permanent magnet 2 is at a value not higher than the allowable stress 5.5 Kgf/mm² and therefore the permanent magnet 2 cannot be broken, as seen from FIG. 5. At this time, the clearance L (between the yoke 1 and the permanent magnet 2) to be filled with the adhesive 3 is not smaller than 0.12 mm (L≧0.12 mm).

Figure 6:
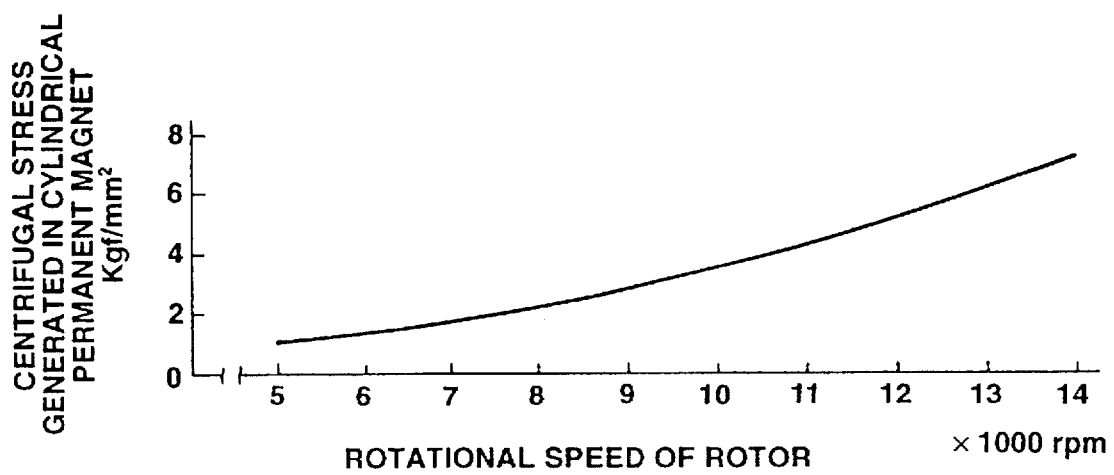
FIG. 6 is a graph showing the centrifugal stress generated in the cylindrical permanent magnet of the magnet rotor of FIG. 1, in terms of the rotational speed of the magnet rotor.
Figures 7A, 7B, 7C:
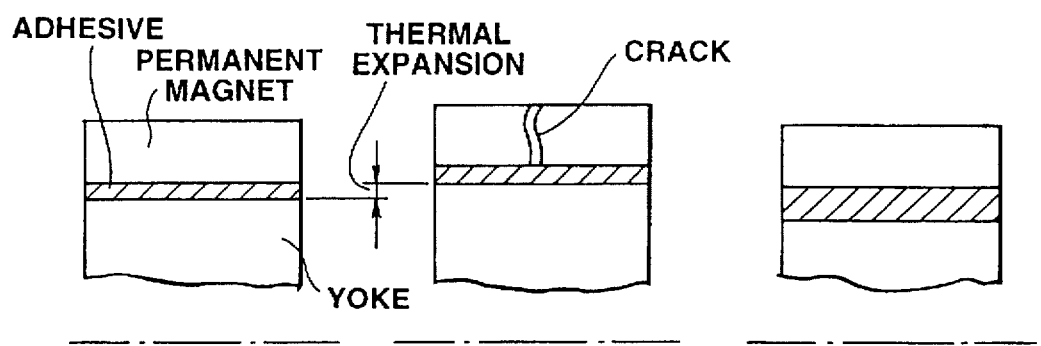
FIGS. 7A to 7C are schematic fragmentary sectional views showing the bonding states of a bonding section between a yoke and a cylindrical permanent magnet of a conventional magnet rotor.

The embodiment of the magnet rotor of the present invention is arranged as discussed above, adhesion or bonding between the yoke 1 and the permanent magnet 2 is accomplished at a temperature around the highest temperature in use of the motor. Accordingly, a surplus to the allowable stress of the cylindrical permanent magnet can be made as shown in FIG. 3, and therefore the magnet rotor can be continued to be safely used without anxiety even upon application of a high centrifugal force or stress as shown in FIG. 6.

Additionally, it will be appreciated that troubles such as demagnetization (or reduction in magnetic force) can be prevented by accomplishing magnetization of the magnet rotor after operation of application of the adhesive 3 during production of the magnet rotor.

Figure 11:
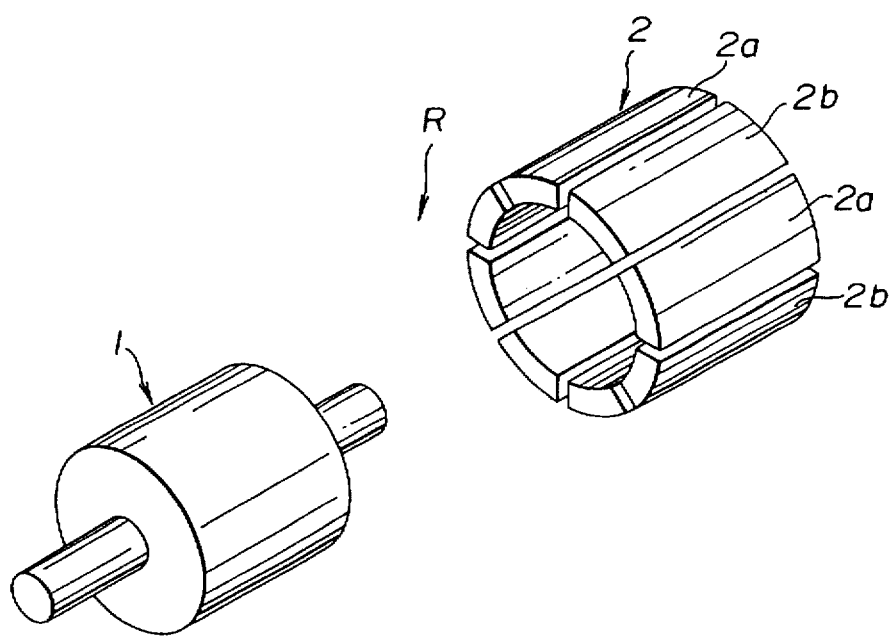
FIG. 11 is an exploded perspective view of a modified example of the embodiment of the magnet rotor according to the present invention.

While only the one-piece type cylindrical permanent magnet has been shown and described as a permanent magnet, it will be understood that the permanent magnet 2 may be formed of a plurality of separate pieces (each having an arcuate cross-section) 2a, 2b whose number corresponds to the number of poles, as shown in FIG. 11 in which the adjacent pieces 2a, 2b have respectively a N pole and a S pole.

What is claimed is:

1. A magnet rotor for a synchronous motor, comprising:
   a yoke formed of a magnetic material and having a cylindrical outer peripheral surface;
   a generally cylindrical permanent magnet having N and S poles and having a cylindrical inner peripheral surface, said permanent magnet being disposed around said yoke; and
   an adhesive disposed in a clearance between the outer peripheral surface of said yoke and the inner peripheral surface of said permanent magnet and encountering a range of temperatures during operation of the motor, said adhesive having a hardening temperature around a maximum temperature encountered during the operation of the motor,
   wherein said adhesive is heated to said hardening temperature and is thereby under a tension during operation of said motor at a temperature below said hardening temperature, and
   wherein said adhesive under said tension absorbs a difference in thermal expansion between said yoke and said permanent magnet.

2. A magnet rotor as claimed in claim 1, wherein said yoke has a cylindrical outer peripheral surface.

3. A magnet rotor as claimed in claim 1, wherein said S and N poles in said permanent magnet are alternately located at equal intervals in a circumferential direction of said permanent magnet, each pole extending in a radial direction and in an axial direction of said permanent magnet.

4. A magnet rotor as claimed in claim 1, wherein said yoke has a coefficient of thermal expansion higher than that of said permanent magnet.

5. A magnet rotor as claimed in claim 1, wherein said clearance between said yoke and said permanent magnet has a dimension L which is given by the following formula:

$$L \geq (E \times \Delta L) / \sigma s$$

where E is a tensile elastic modulus of said adhesive; ΔL is a change amount of said clearance upon thermal expansion or contraction; and σs is a tensile stress of said adhesive;

wherein said clearance change amount ΔL is given by the following equation:

$$\Delta L = (t1-t0) \times D \times (\alpha1-\alpha2)$$

where t1 is the temperature at which said adhesive is hardened; t0 is a lowest environmental temperature in use of the motor; D is a diameter of a section of said yoke on which the adhesive is applied; α1 is a coefficient of thermal expansion of said yoke; and α2 is a coefficient of thermal expansion of said permanent magnet.

6. A magnet rotor as claimed in claim 1, wherein the poles of said permanent magnet are formed by magnetizing a material of said permanent magnet after hardening of said adhesive.

7. A magnet rotor as claimed in claim 1, wherein said permanent magnet is formed of a plurality of separate pieces each having an arcuate cross-section, the number of said pieces corresponding to that of said poles.

8. A magnet rotor as claimed in claim 1, wherein said adhesive is of a silicone-system.

9. A magnet rotor as claimed in claim 8, wherein said silicone-system adhesive has a tensile elastic modulus of not higher than 3 Kgf/mm$^2$ and an elongation percentage of not lower than 200%.

10. A method of producing a magnet rotor for a synchronous motor, comprising the steps of:

providing a yoke formed of a magnetic material and having a cylindrical outer peripheral surface;

providing a generally cylindrical permanent magnet having N and S poles and having a cylindrical inner peripheral surface;

locating said permanent magnet around said yoke;

filling an adhesive having a hardening temperature close to a maximum temperature encountered during operation of the motor in a clearance between the outer peripheral surface of said yoke and the inner peripheral surface of said permanent magnet; and heating said adhesive to the hardening temperature to bond said yoke to said permanent magnet, wherein said adhesive is under tension during operation of said motor at a temperature below said hardening temperature and thereby said adhesive absorbs a difference in thermal expansion between said yoke and said permanent magnet.

11. A method as claimed in claim 10, further comprising the step of magnetizing a material of said permanent magnet to form said poles after the step of heating said adhesive.

12. A method of producing a magnet rotor for a synchronous motor, comprising the steps of:

providing a yoke formed of a magnetic material and having a cylindrical outer peripheral surface;

providing a generally cylindrical permanent magnet having N and S poles and having a cylindrical inner peripheral surface;

disposing said permanent magnet around said yoke;

determining a maximum temperature encountered during operation of the motor;

selecting an adhesive having a hardening temperature near said maximum temperature;

filling said adhesive in a clearance between the outer peripheral surface of said yoke and the inner peripheral surface of said permanent magnet; and heating said adhesive to the hardening temperature, wherein said adhesive is under tension during operation of said motor below said hardening temperature and thereby said adhesive absorbs a difference in thermal expansion between said yoke and said permanent magnet.

13. A method as claimed in claim 12, further comprising the step of magnetizing a material of said permanent magnet to form said poles after the step of heating said adhesive.

* * * * *